Feb. 13, 1973

B. P. PIWCZYK 3,716,712

APPARATUS FOR AND METHOD OF ORIENTING
CRYSTAL WAFERS

Filed Sept. 27, 1971

United States Patent Office 3,716,712
Patented Feb. 13, 1973

3,716,712
APPARATUS FOR AND METHOD OF ORIENTING CRYSTAL WAFERS
Bernhard Peter Piwczyk, Kanata, Ontario, Canada, assignor to Northern Electric Company Limited, Montreal, Quebec, Canada
Filed Sept. 27, 1971, Ser. No. 183,782
Int. Cl. G01n 21/00
U.S. Cl. 250—51.5
11 Claims

ABSTRACT OF THE DISCLOSURE

Method of and apparatus for orienting crystal wafers, particularly for producing X-ray diffraction topographs. The wafer is mounted slightly inclined to the vertical and rotation about the $\theta$ and $\gamma$ axes is carried out under control of circuits responsive to the intensity of diffraction. The wafer is oriented automatically at a rotative position giving maximum diffraction for each axis. To produce a topograph, scanning of the wafer is provided.

---

This invention relates to apparatus for and a method of, orienting crystal wafers, particularly for the production of topographs.

Wafers of single crystals are used for many purposes in which dislocations in the material reduce the yield or adversely affect the material in use. A particular example is the use of thin wafers of single crystal silicon material used for integrated circuits. It has been found that certain crystal dislocations allow preferential diffusion to occur along the disloctaions during the diffusion processes employed during manufacture. Low breakdown voltages and high leakage currents then occur at semiconductor device junctions. Dislocations introduced during early processing stages, or existing already in the starting material severely reduce device yield. In particular slip defects are a major cause of poor yield.

X-ray topography is the best known method capable of showing crystal dislocations nondestructively. However, this method has been restricted to the laboratory environment as its application is too inconvenient and too slow for use in a production environment. In particular the following steps are involved: sample mounting; sample alignment; long exposures and development of the photoplate. While considerable advances have been made to reduce the difficulties of the last two steps—by the use of image intensifier systems, for example, there is still the tedious, and critical, tasks of sample mounting, alignment and data recording.

Known topographical systems employ a vertical sample mounting technique and a vertical rotational axis for the "Bragg" angle—$\theta$. Various techniques are employed to mount the sample—glue, wax or thin plastic foils for example. These are to a greater or lesser extent cumbersome and introduce some mechanical strain in the sample. Straining the sample is particularly objectionable since this results in part of the sample failing to meet the Bragg condition.

In the present invention the rotational axis of the wafer for the Bragg angle is substantially horizontal. This enables the sample to be mounted by merely positioning the wafer on an inclined plane. The plane is slightly inclined from the vertical, facing upwardly, and the wafer rests against the plane and held in place by gravity. By this means the wafer is for all practical purposes strain free so far as the mounting is concerned.

The invention also includes means for detecting and measuring the intensity of the diffracted X-ray beam and using such measurement to control the movement—rotation—of the crystal wafer about the substantially horizontal axis. By this means the wafer can be automatically oriented. This feature provides a further use of the invention in that it can be used to check that wafers have been made to specified crystal orientation. A typical example is silicon wafers used in the manufacture of semiconductor devices. These wafers are produced with a flat on the periphery, the flat indicating a particular crystallographic direction. If this flat is not correctly positioned or, if, for any reason, there is some fault in the manufacture of the crystal wafer which affects the relationship between flat and crystallographic direction, the present invention can be used to detect this. The wafer is mounted on the support with the flat downwards and acting as a locating datum. The peak diffraction intensity can then be found and the angular relationship determined—as will be described in more detail later.

Thus in its broadest aspect the invention provides an apparatus, and method, for automatically determining the orientation of a crystal wafer relative to a known datum. The invention also provides an apparatus, and method, for the making automatically of X-ray topographs of thin single-crystal wafers.

In accordance with the invention an apparatus for the orientation of a crystal wafer comprises a carrier for holding the wafer so that it is inclined slightly from the vertical and having its front surface facing slightly upwardly, a support for the carrier, rotating means for rotation of the carrier about a first axis substantially normal to the wafer front surface, an X-ray generator for producing a beam of X-rays and impinging the beam on the wafer for diffraction thereby, and measuring and control means for rotating the carrier about the first and second axes and measuring the intensity of diffraction for each axis of rotation.

Also in accordance with the invention a method of orienting a crystal wafer comprises resting a wafer on a carrier at a slight inclination to the vertical with a front surface inclined slightly upwards, impinging a beam of X-rays on the surface, rotating the wafer about a first axis substantially normal to the surface, and about a second axis substantially parallel to the surface, measuring the intensity of diffraction of the X-ray beam and controlling the rotation of the wafer about the two axes in accordance with the measured diffraction to orient the wafer.

In accordance with a particular feature of the invention, apparatus for the production of X-ray topographs of crystal wafers, or platelets, comprises a carrier for holding a wafer in an inclined plane with a front surface inclined slightly upwardly, a support for the carrier, means for rotating the carrier about a first axis substantially normal to the wafer front surface and about a second axis substantially parallel with the wafer front surface, an X-ray generator for producing a beam of X-ray for impinging on the wafer surface for diffraction thereby, control means and measuring means for rotating the carrier and wafer about the two axes and detecting the peak intensity of diffraction for each axis, and for controlling the rotation of thes carrier to orient the wafer for maximum diffracted beam intensity, and means for scanning the wafer with the X-ray beam and for recording the diffracted radiation.

Also in accordance with a particular feature of the invention, a method of producing X-ray topographs of crystal wafers comprises resting a wafer on a carrier with a front surface slightly inclined to the vertical and facing upwardly, generating a beam of X-rays and impinging the beam on the wafer for diffraction thereby, detecting and measuring the diffraction of the beam while rotating the wafer sequentially about a first axis substantially normal to the front surface and about a second axis substantially parallel with the wafer, to detect the maximum intensity of the diffracted beam for each axis, and controlling the rotation of the wafer in accordance with the measurement of the maximum intensity of the diffracted beam to orient the wafer for maximum diffracted beam intensity, scanning the wafer with said beam of X-ray and recording the diffracted radiation.

The invention will be understood by the following description of known methods and apparatus for producing topographs of crystal wafers and of particular embodiments of the present invention, in conjunction with the accompanying diagrammatic drawings in which.

Figure 1:
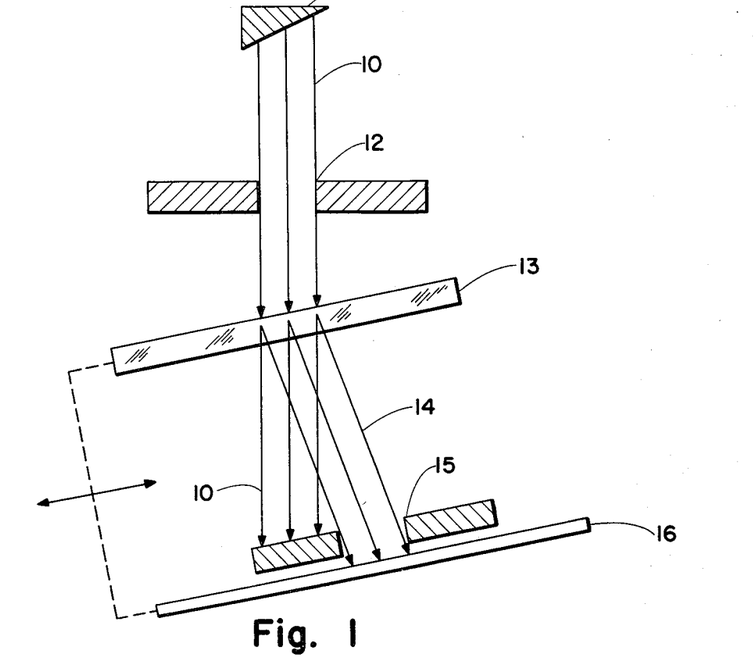
FIG. 1 is a plan view of a known apparatus and method for X-ray topography.

FIG. 1 illustrates schematically a known method for imaging disclocations present in thin slices of single crystals –generally referred to as the Lang type X-ray topograph or transmission topography. A beam of X-rays 10, from a source 11 is collimated through a slit 12 and impinges on the crystal 13, under study. The beam is diffracted –in accordance with what is referred to as the Bragg condition– from an appropriate set of lattice planes, as indicated at 14. The diffracted beam is passed through a further slit 15 falls on a film 16 to produce a diffraction image representing an image of the part of the crystal lattice traversed by the direct beam.

If a sufficiently wide beam of parallel X-rays were available a projection picture of the entire crystal could be produced. A highly collimated beam wide enough to cover silicon wafers up to three inches wide as at present used, is impractical. Therefore the crystal wafer and film is mounted on a slide, accurately machined and wafer and film moved together parallel to the crystal surface during the exposure.

A perfect crystal will diffract X-rays uniformly from a given set of lattice planes. Any imperfections which disturb the lattice periodicity, such as dislocations, will diffract the impinging radiation with added intensity leading to increased blackening of the photographic plate (film) at the location of the plate corresponding to the location of the imperfection in the crystal. Stresses and strains imposed on the crystal either by the method of holding the crystal or by thin films under stress or strain present on the surface of the crystal also cause images of uneven intensity depending on the degree of lattice distortion.

It is known that any high resolution Lang type topographic camera system uses a highly collimated beam of X-rays, rendering a larger part of the radiation output of the X-ray tube useless for the formation of the topographic image. It is possible to obtain high resolution (220) topographs of silicon wafers one and a half inches in diameter and 0.2 mm. thickness with exposure times of 10–15 hours using a conventional X-ray generator, for example a standard generator as sold by Philips Electronic Equipment equipped with a fine focus molybdenum target tube operated at 45 kv. and 15 ma., and an Ilford nuclear track plate with an emulsion thickness of 50 $\mu$m. The exact exposure time varies with the accuracy of the camera alignment, and the developing technique employed in the processing of the photographic plate, or film.

While optimum resolution is necessary for many defect analysis and investigations into semiconductor device process –induced damage, it is an advantage for production purposes to have a crystal defect analysis capability with a reduced resolution capability. The types of crystal imperfections, i.e. slip and mechanical damage such as scratches, which have been shown to be most effective in reducing device yield can be shown very clearly topographically with camera systems providing less than 10 $\mu$m. resolution.

Topographs having a resolution of approximately 150 $\mu$m., with a reduction in mounting, alignment, exposure and processing problems are now obtainable by the use of Polaroid film. The developing time is only fifteen seconds and the use of high speed films—for example 3200 ASA speed rating—in conjunction with an X-ray casette incorporating a fluorescent phosphor intensifier screen reduces exposure time by approximately two orders of magnitude so that large area topographs of two inch diameter wafers can be attained with an exposure time of less than one minute.

Figure 2:
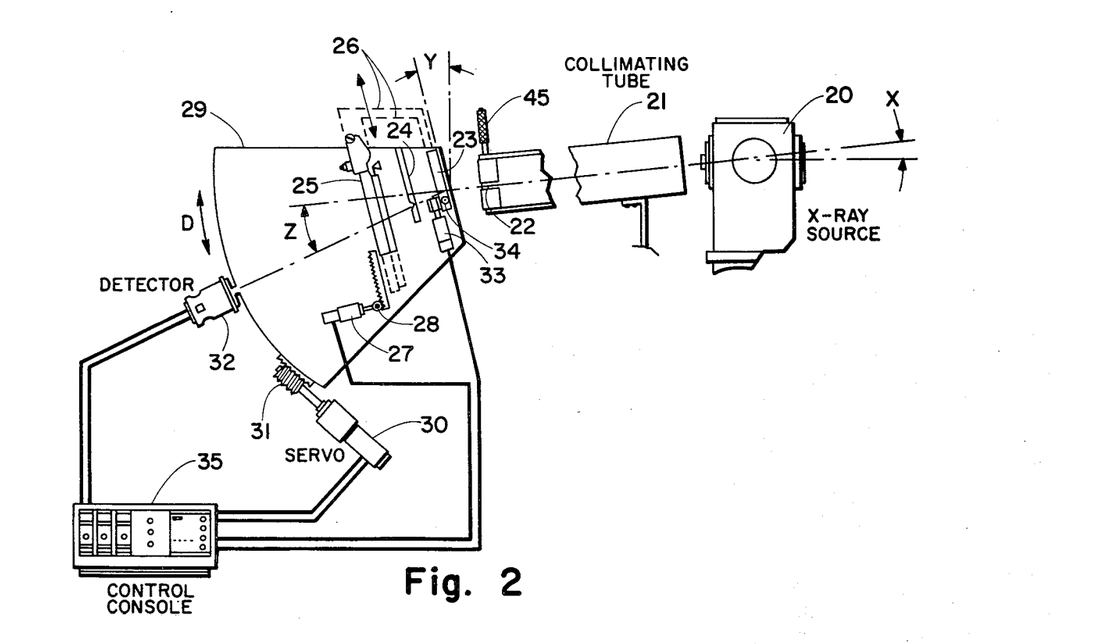
FIG. 2 is a side view of an apparatus in accordance with the present invention.

FIG. 2 is a diagrammatic side view of an apparatus, in accordance with the present invention. The apparatus comprises an X-ray tube 20, having a molybdenum target, the beam of X-rays passes through tube 21 and issued through a horizontal collimating slit 22. A crystal wafer is mounted in a carrier 23—illustrated in more detail in FIG. 3—the wafer, and carrier, being slightly inclined from the vertical so that the wafer rests in the carrier under the effect of gravity. By so mounting the wafer, there is obtained the elimination of troublesome stress and strains introduced by conventional mounting techniques. Virtually no extrenal stresses or strains are introduced since the wafer is held in place by its own weight.

Positioned behind the carrier 23 is a further slit 24 which passes only the diffracted beam but prevents the normal beam impinging on the photo plate or film which is mounted in a further carrier at 25. Carrier 23 and carrier 25 are connected together—indicated diagrammatically by dotted lines 26—to move simultaneously and in step to provide scanning of the wafer. The two carriers are moved by a servo indicated at 27 through gearing 28.

The carriers 23 and 25, slit 24 and servo 27 are mounted on a support member 29 which is mounted for rotation about an axis which is substantially horizontal and coincident with the wafer surface. The axis usually also passes through the centre of the wafer. This axis is referred to as the $\theta$ angle and the angular rotation about this axis as the $\theta$ angle. The support member 29 is rotated about the $\theta$ axis by a servo 30 and gearing 31. Mounted at the rear of the support member 29 is a detector 32. Detector 32 detects the intensity of the diffracted beam issuing from the wafer through the slit 24.

The carrier 23, for the wafer, is also mounted so that it can be rotated about an axis normal to the wafer surface, and intersecting the $\theta$ axis. This axis is referred to as the $\gamma$ axis, rotation about the axis known as the $\gamma$ angle. Rotation of the carrier 23 about the $\gamma$ axis is by servo 33 via gearing 34.

The operation of the servos 27, 30 and 33, is controlled by a control console 35, to which is fed the output from the detector 32. The operation of the control console 35 will be described later.

Figure 3:
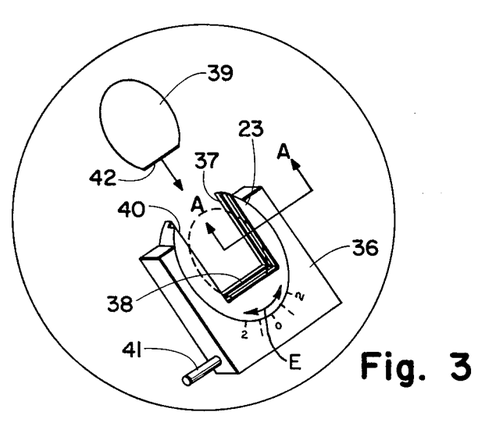
FIG. 3 is an enlarged view of one item of FIG. 2.
Figure 3A:
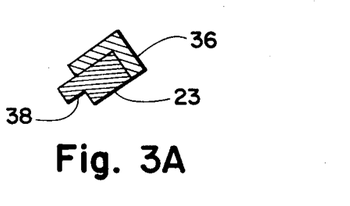
FIG. 3A is a cross-section on the line 4—4 of FIG. 3.
Figure 4:
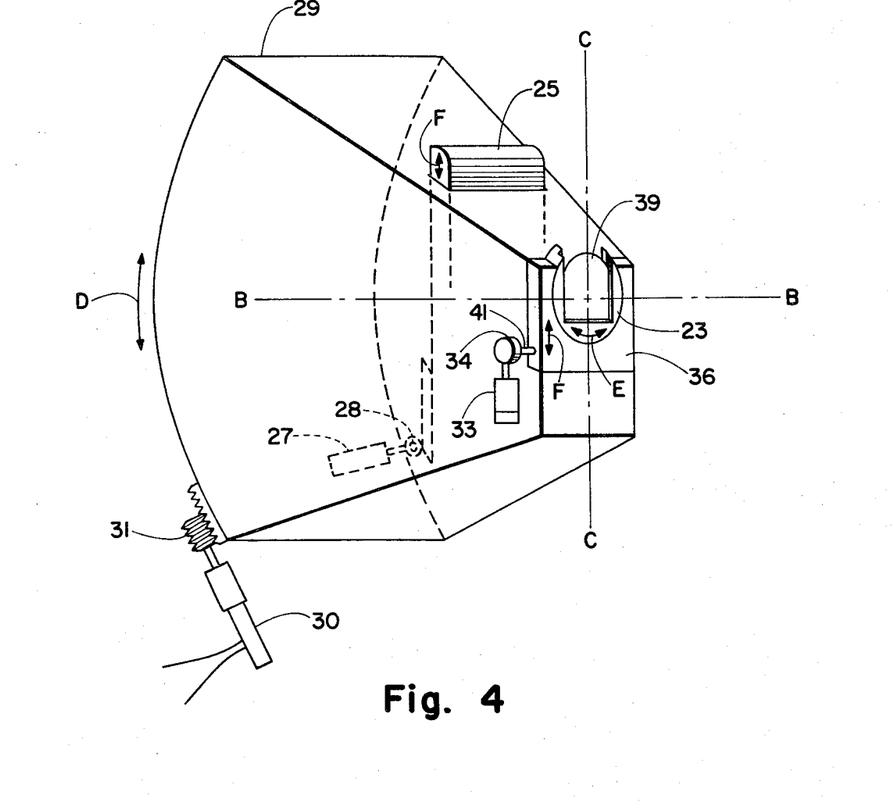
FIG. 4 is a perspective view of part of the apparatus showing the rotational axes.

FIG. 3 illustrates to a larger scale and in more detail the carrier 23 and the method of mounting a wafer in the carrier. The carrier 23 mounted in a support 36, being rotatable relative to the support, in a plane common to the carrier and support, and about an axis normal to this plane—the $\gamma$ axis. The carrier is formed by a thin cylindrical member having a U-shaped slot 37 therein. Slot 37 is of a width equal to the diameter or width of wafers to be positioned in the carrier. The walls of the slot 37 are stepped—the rear part of the slot narrower than the front part—so that a small ledge 38 is formed along each wall of the slot. This is indicated in FIG. 4 which is a cross-section through one side of a carrier 32 and support 36. A wafer is indicated at 39 in FIG. 3 and in position in the carrier rests on the ledges 38, being held against the ledges by its own weight. The position of the wafer in the carrier 23 is indicated by dotted outline 40. The carrier 23 is rotated in the support 36, about the $\gamma$ axis by the servo 33, the gearing 34, rotating shaft 41 (FIG. 3)

which rotates the carrier 23 in the support 36, by means of a worm gear on shaft 41 and a rack on the periphery of the carrier 23 for example. The wafer has a flat 42 formed at its edge which is a datum orienting flat.

The various movements, both rotational and scanning, are seen in FIG. 4. The support member 29 rotates about an axis indicated at B—B, as indicated by the arrow D (also seen in FIG. 2). This rotation, as described, is obtained by servo 30 and gearing 31. The carrier 23 rotates about a centre formed by the intersection of the axis B—B and an axis C—C. This rotation is indicated by the arrow E (also seen in FIG. 3). As described this rotation of the carrier 23 is obtained by servo 33 and gearing 34. Finally, the scanning movement of the support 36 and film carrier 25 is indicated by arrows F, these two members being coupled together, as indicated in FIG. 2.

The apparatus is designed to yield topographs of silicon wafers cut such that their surface is coincident with with (100) or (111) crystal planes using (220) planes for diffraction. As seen in FIG. 2, the X-ray beam is produced with an axis which is slightly downwardly inclined by the angle X. The carrier 23 is slightly inclined to the vertical, by an angle Y. The inclination of the wafer relative to the beam is Y–X and this is arranged to be equivalent to the Bragg angle for diffraction from a (220) plane for the particular wafer material. Thus, for example, Si(111) and (100) can be brought to a useful diffraction condition at Bragg angles of 10.6°, typical values of X and Y are 6.0° and 16.6° respectively. The detector 32 is set at an inclination of 27.7° from the beam axis—angle Z.

A Polaroid film cassette, for example of the type known as XR–7, is a convenient form of film mounting, used with Polaroid type 57 film. However other forms of mount, and film, can be used. The Polaroid film and cassette enable very fast exposures to be made.

For crystal orientation the same mount (or carrier 23) is rotated around an axis nearly parallel the flat 42, substantially parallel to wafer surface and intersecting the centre of the wafer ($\theta$ rotation). A second rotation axis is pependicular to the wafer ($\theta$ rotation).

The apparatus of the particular example is limited to a ±2° rotation about the $\theta$ axis. However this is sufficient for the purpose as any crystals not having a peak diffraction within this range do not meet specific requirements.

The sequence of events to orient a silicon wafer to meet the correct Bragg condition to yield (220) topographs is as follows:

(a) A wafer 39 is set into the carrier 23 so that the incident X-ray impinges upon the centre of the wafer. Since the flat 42 of the wafer 39 is parallel to a (110) direction with ±½° it is automatically aligned within ±2.50° (max., sample rotation, 2°+max. deviation of flat from the correct value, ½°=2.5°) with respect to the horizontal. This is sufficiently close to permit orientation of the sample with respect to the $\theta$ angle if the wafer has been cut within the normally specified limits given for silicon wafer material.

Figure 5:
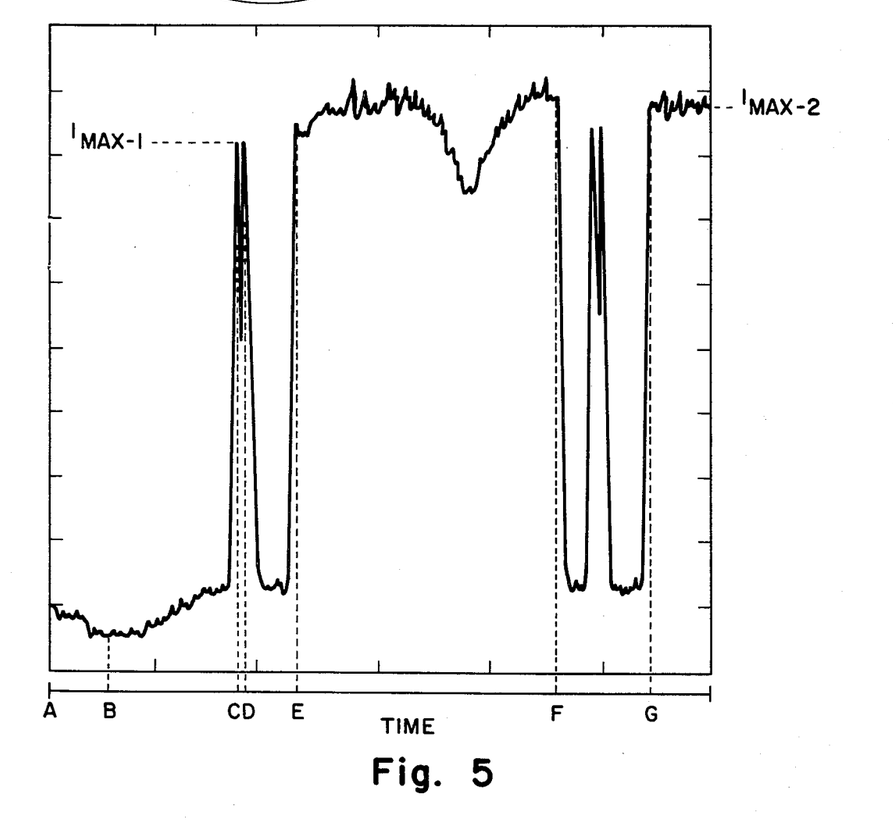
FIG. 5 is a curve illustrating peak intensity seeking.

(b) Sample orientation is carried out automatically by an electromechanical servomechanism. A plot of the diffracted beam intensity is shown in FIG. 5 as the sample is oriented. The sections labelled by A, B, C, D, E, F and G in this figure mark different events during the sample alignment procedure.

At the beginning the $\theta$ angle is scanned to one end of the range, (Section AB) starting from whatever value of $\theta$ (A) was present initially by rotation about the $\theta$ axis. $\theta$ is scanned until a peak is detected (C) and the exact position of the peak is memorized. Scanning continues past the peak to (D) since only by reading lower intensity values than $I_{MAX1}$ can the peak detector "know" that a peak has been passed. $\theta$ is now scanned in the reverse direction by an amount $\Delta\theta$ past the peak, and then the scanning direction again reversed so that the peak is then approached from the direction until the previously memerized $\theta$ is reached (E). This latter operation is required so that any possible mechanical backlash does not interfere with achieving a precise alignment for $\theta_B$. The same procedure is followed in aligning the wafer by rotation around an axis perpendicular to the wafer surface and intersecting centre, $\gamma$-rotation. (E–F). By aligning the wafer in this manner the optimum diffraction intensity is attained. The $\theta$ alignment is repeated to optimize the diffracted beam intensity until the final maximum $I_{MAX2}$ is attained (G). The entire alignment cycle required approximately one minute depending on the starting position of the scanning mechanisms.

Alignment about the $\gamma$ axis is dependent on the width of the collimating slit 22 (FIG. 2). It has been found, for an example as described above, that the slit width should be 1.0 mm., or 0.04 inch. A Philips X-ray generator with a vertically mounted molybdenum fine focus X-ray tube has a focal spot when viewed at the take off angle of 6° which has a height of 0.04 cm. Collimating slit 22 is provided with adjusting means 45 by which the slit width can be varied, and also adjusted so that the centre of the X-ray beam coincides with the centre of the wafer if the scanning mechanism is positioned at the centre of the range.

The resolution is dependent on the width of the slit 22, and on the resolution obtainable by the recording film. With Polaroid type 47 film using fluorescent screen incorporated in the XR–8 cassette, the resolution has been found to be 150$\mu$. With a slit width of 1.0 mm. or 0.04 inch this resolution is obtained. Narrower slits will not provide any useful improvement in resolution as this limit is set by the fluorescent screen in the cassette.

Repeatability and accuracy of sample alignment using a collimating slit width of 0.04 inch is excellent; ±0.01° for $\theta_B$ and ±0.02° for $\gamma$. The repeatability is illustrated by the following table:

TABLE I

| | $\theta_b°$ | $\gamma°$ |
|---|---|---|
| Trail: | | |
| 1 | 1.04 | 1.73 |
| 2 | 1.04 | 1.75 |
| 3 | 1.04 | 1.76 |
| 4 | 1.04 | 1.75 |
| 5 | 1.03 | 1.77 |
| 6 | 1.04 | 1.76 |
| 7 | 1.04 | 1.76 |
| 8 | 1.03 | 1.75 |
| 9 | 1.04 | 1.76 |
| 10 | 1.04 | 1.76 |

(c) Following sample alignment the sample is scanned linearly without changing $\theta$ or $\gamma$ so that the X-ray beam impinges on the sample holder silghtly below the wafer. A loaded Polaroid XR–7 cassette is inserted in the cassette holding bracket and a slow scan whereby the sample and film move synchronously is initiated. The exposure time is approximately 30 seconds depending on the sample size and the diffraction intensity obtained from the sample. The scanning speed can be varied as required.

(d) After a completed exposure the Polaroid film is developed normally (15 seconds) and a completed topograph having a resolution of ~150$\mu$ m. is obtained.

The fast, low resolution topographic system described above yields topographs with a resolution of 150$\mu$ m. This resolution is adequate to analyze silicon wafers quickly (2–3 minutes per wafer) and nondestructively for:

(a) slip dislocation arrays
(b) mechanical damage (small scratches not visible by optical means)
(c) high density dislocation arrays
(d) strain The equipment can further be utilized to rapidly check the accuracy of wafer orientation.

The apparatus can be used to ensure that wafers are correctly oriented. For example, the flat 42 on the wafer 39 (see FIG. 3) is intended to be parallel to a (110) direction, within certain predetermined limits, for example ±0.5°. If the flat is not parallel to the desired degree it will not be possible for the apparatus to find a peak diffraction value. Therefore, conversely, if a wafer is put in the carrier and the alignment process commenced, and a peak diffraction value not found then the wafer is not to specification and is not acceptable in that it will not be usable. The apparatus can therefore be used for a method of ensuring that wafers in accordance with specification are separated from those not to specification. Considerable time and expense can be saved by preventing further processing of wafers which are unsuitable.

The apparatus is arranged so that the process, or method, is carried out automatically once a wafer has been inserted in the carrier, the only actions required by an operator thereafter being the initiating of the peak finding and orientation procedure of the wafer and, when the wafer has been automatically oriented, the placement of a loaded film cassette in the cassette holder and initiation of the scanning procedure. After completion of the process the film is processed to produce a topograph. When used for sorting wafers only the peak finding and orienting procedure is carried out.

The controller for the apparatus is a hybrid device using digital circuits, operational amplifiers, DC motors, and other functional modules.

The controller sweeps the sample along the $\theta$ axis and stops where the scintillation counter or detector 32 reads maximum. Next the sample is rotated ±2° again stopping at the peak scintillation counter reading. Finally the $\theta$ axis sweep is repeated and the operation terminates with the sample oriented in the best position to produce a good topograph.

The mechanical drive is provided by two DC motors connected in a servo loop and switched in and out by relays. A third DC motor is used to provide the variable scanning time. FIGS. 6 to 12 are various circuit diagrams of a particular arrangement for controlling the apparatus. It will be understood that the particular arrangement illustrated in FIGS. 6 to 11 is only one way of controlling the apparatus and many alternatives will exist. In many instances standard, well-known, sub-circuits are used. Detailed description is not necessary and the board operation of the circuit only is described. The following description is separated into sections, for simplicity and convenience.

ANALOG CIRCUITS—6, and 7A and 7B

The output from the detector 32 (FIG. 2) is fed to the input amplifier 50 which is connected is a differential amplifier with a gain of approximately two and an input impedance of 1K ohms.

The output of amplifier 50 is summed with multivibrator output pulses from the multivibrator 51 at summing amplifier 52. Amplifier 52 is connected as an inverting summing amplifier with signal gain of approximately 2.8. The multivibrator 51 is a simple two transistor ($Q_1$ and $Q_2$) astable configuration.

The summing amplifier 52 output is connected to a peak memory circuit comprising amplifiers 53 and 54, and also to a non-inverting follower 55. The peak memory circuit detects the negative peaks and provides memory, via capacitor 56, 0.1μf., connected to the non-inverting input of amplifier 54. The peak memory circuit has a combined gain of plus one. Relay 57 resets the peak detector to a threshold level which is determined by the threshold adjust potentiometer 58. This presets the peak detector output so that the input must exceed the threshold level (about −2 volts). Thus the input residual noise is avoided.

Figure 9:
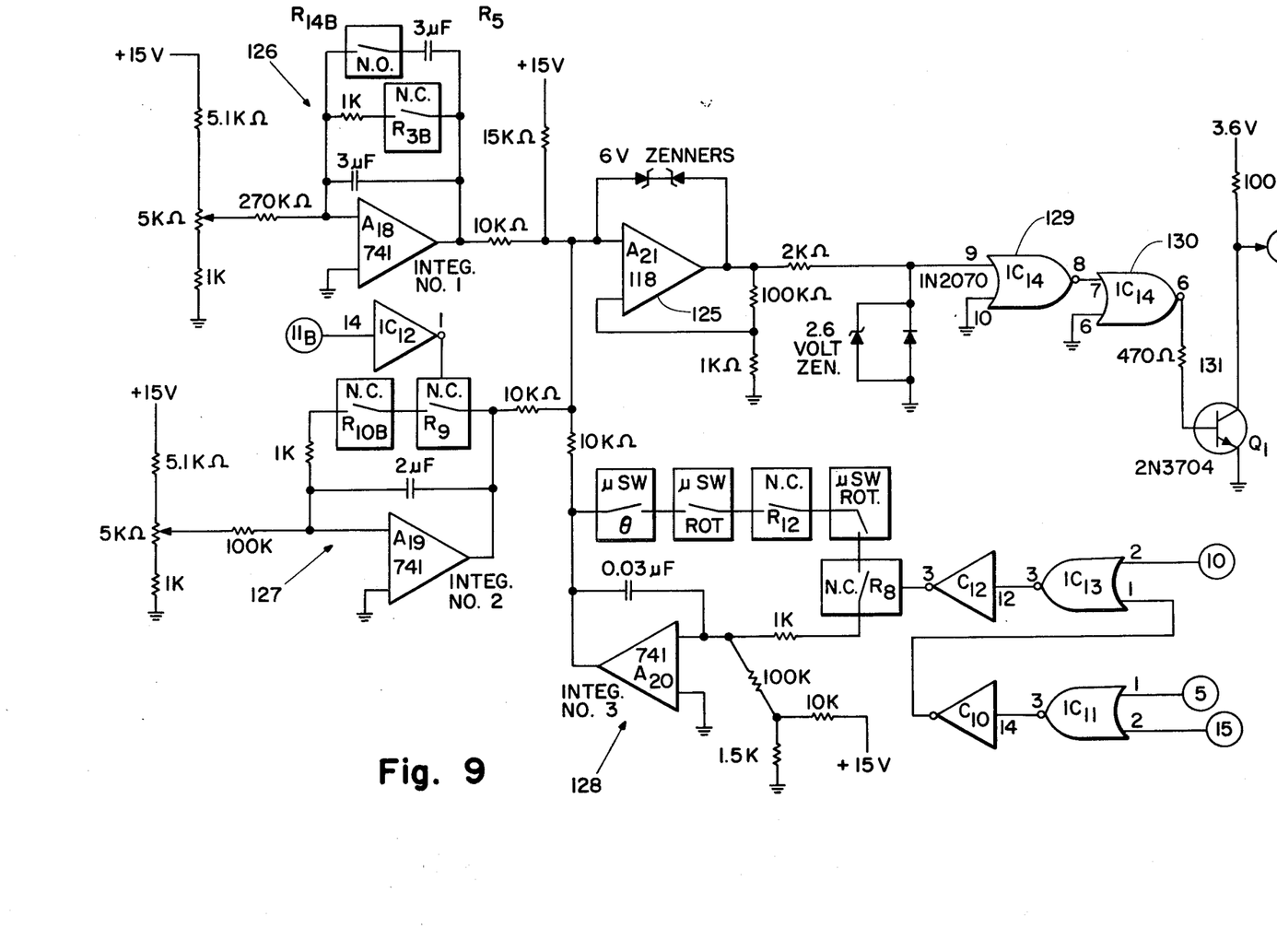

Amplifier 59, provides unity gain inversion of the follower 55 ouput which is summed with the peak memory output in an inverting summing comparator 60. Thus the output from comparator 60 goes positive when the peak memory output is significantly larger than its input. The threshold level is connected to the non-inverting input of the follower 55 so that the comparator 60, is approximately at zero (or negative) during reset condition. Relay 61 is energized by the comparator 60 at about +10 volts, determining that a peak has occurred and relay 61 provides the necessary feedback to the digital switching via integrator No. 3 (128) (FIG. 9).

The peak memory circuit output is also connected to inverting differentiator 62. Differentiator 62 is designed to work on the pulses summed in at amplifier 52. The peak memory circuit passes only the negative going edges and successive more negative going edges. These transitions produce positive pulses from the inverting differentiator 62. These positive pulses are amplified by amplifier 63 (gain approx. 21) which energizes relay 64. Relay 64 switches the sample and hold mode control 65 to "sample." The de-energized condition is "hold." Thus, the sample and hold module takes its final "sample" on the last most negative going transition from the peak memory circuit which corresponds to the peak output from the scintillation counter.

Figure 7A:
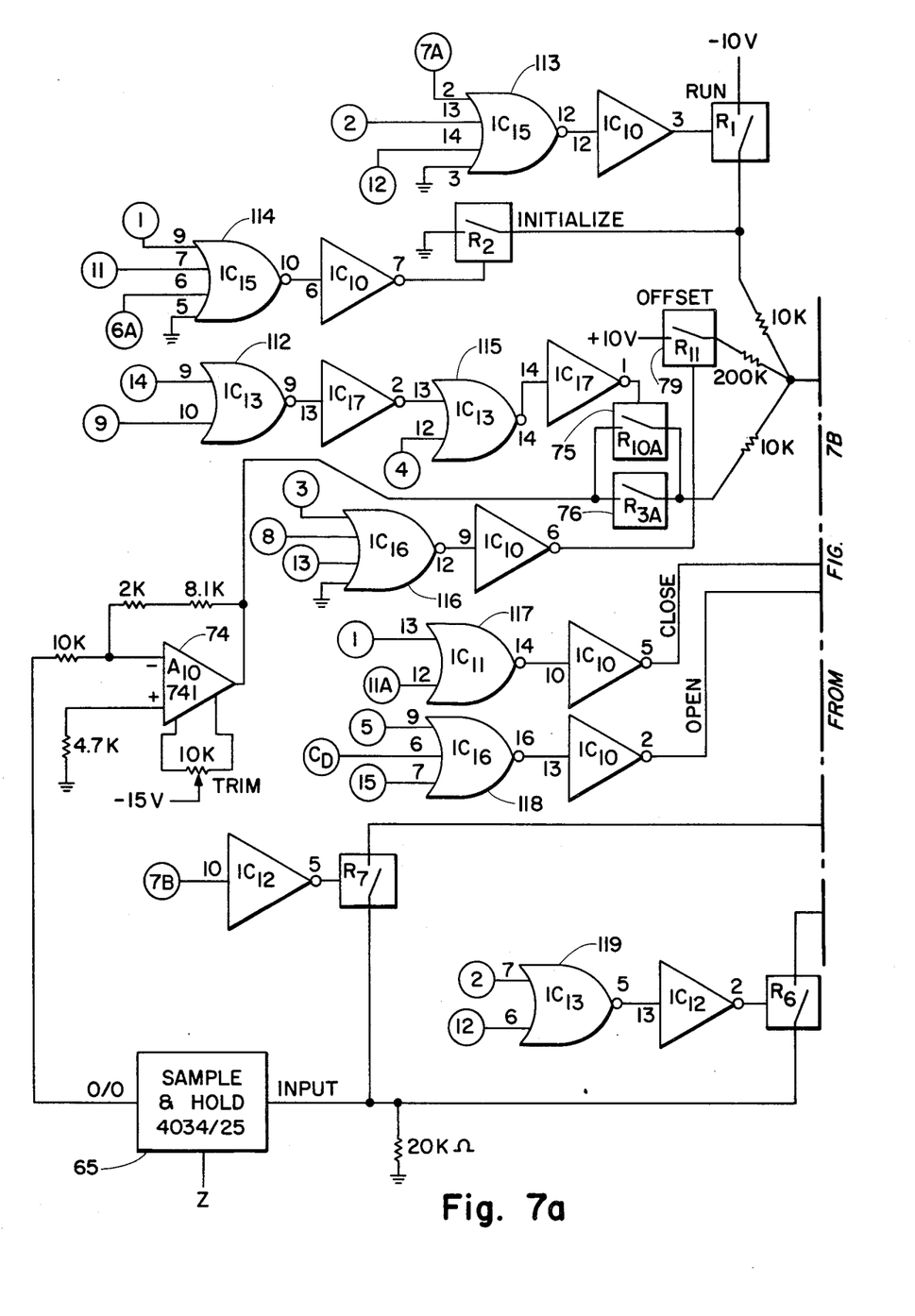

As shown in FIG. 7, the sample and hold input may be connected to amplifiers 70 or 71 which are connected to $\theta$ and rotation reference potentiometers 72 and 73 respectively. Thus, the sample and hold module 65 stores the electrical position at which the detector 32 reads the peak.

The sample and hold output is connected to amplifier 74, a unity gain inverter. Amplifier 74 output may be connected to the amplifier input by relays 75 or 76. The servo amplifier is made up to two stages: an inverting summing amplifier 77 and an inverting power amplifier 78. Amplifier 77 has a gain of 51 and amplifier 78 has a variable gain of 1 to 6.

By inverting the sample and hold output and summing it with the proper reference potentiometer, it is possible to drive the device to the correct position as stored by the sample and hold circuit. Also, by summing in an "OFF-SET" by means of relay 79, it is possible to go past the correct position. Removing the offset causes the device to drive to the correct position, in the same direction in which the peak was detected initially. This eliminates mechanical backlash.

Manual control is achieved by switching the manual control potentiometers 80 and 81 to the servo amplifier by switch 82. Negative 10 volts is connected to the manual potentiometers 80 and 81 to provide correct summing polarity. Amplifiers 83 and 84 are connected in the voltage follower configuration to provide high input impedance and low output impedance.

Figures 7B, 10:
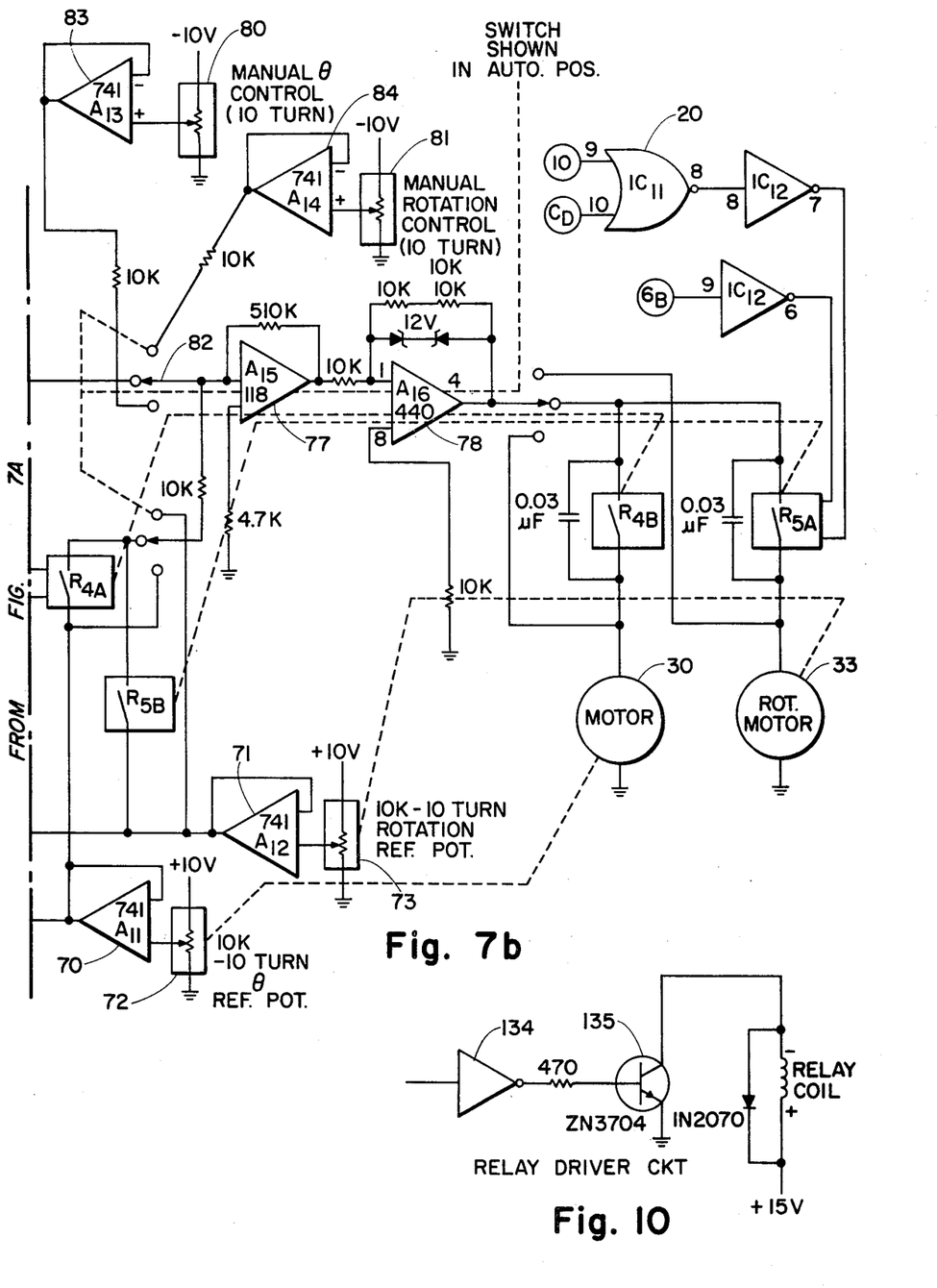
Figure 8:
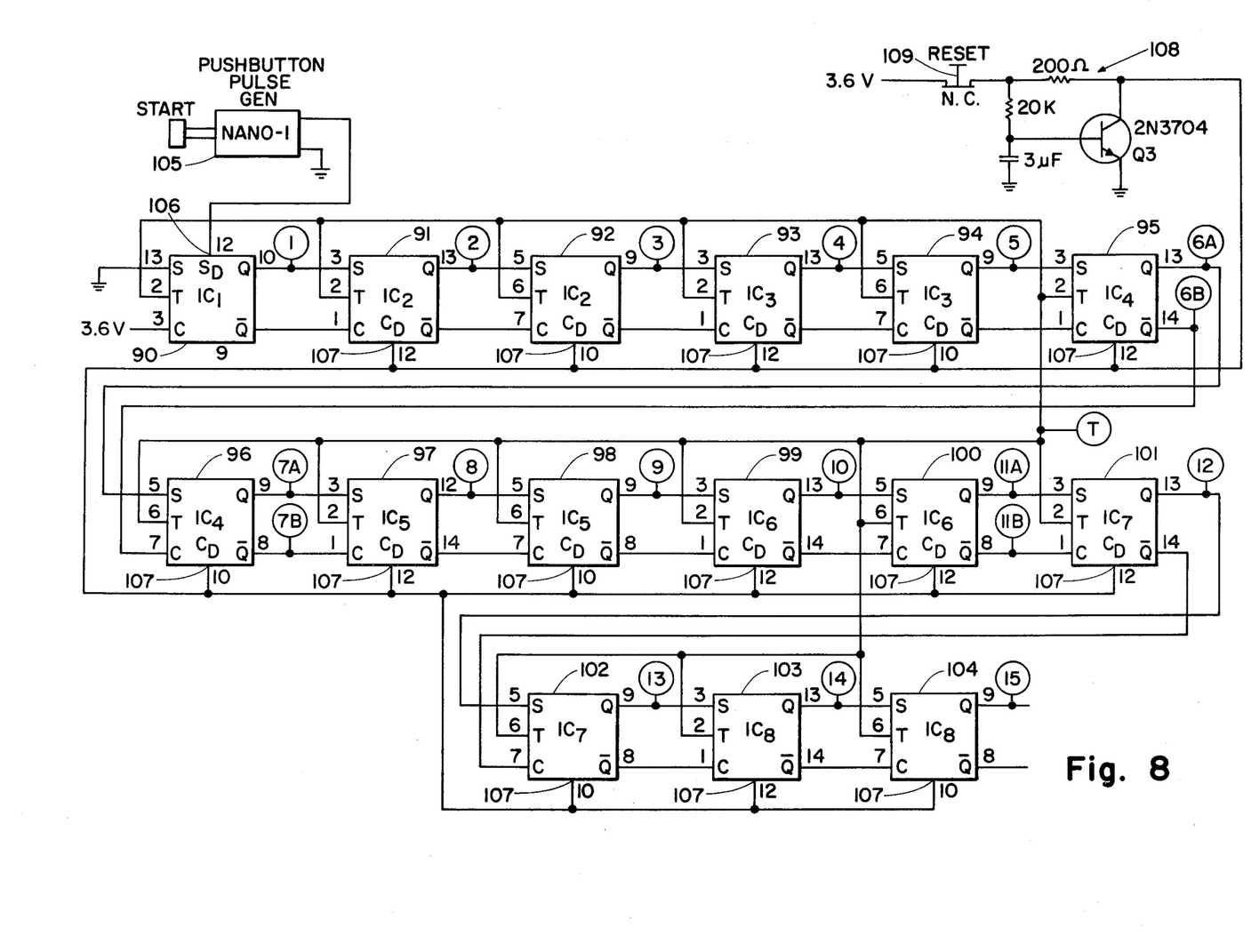

DIGITAL SWITCHING—FIGS. 7, 8 and 9

The digital switching is accomplished by 15, J–K flip flops connected as a shift register, items 90 to 104, FIG. 8. A pushbutton pulse generator 105 is connected to direct set 106 of the first flip-flop 90 to "START" the digital switching. The direct clear terminals 107 of the flip-flops are all connected to a power switch-on initializing circuit 108 which is also used as a reset by employing a normally closed pushbutton switch 109.

Two and four input NOR gates 112–120 are used to provide the required switching logic.

Clock pulses for the ring counter originate from inverting summing comparator 125 (FIG. 9). The negative going output from integrators 126, 127 or 128 respectively—No. 1, 2 or 3, is summed into comparator 125 with positive reference current provided by +15 volts across 15K ohms. Integrators 126, 127 and 128 provide the necessary delays between digital stepping operations. The output from comparator 125 is connected in series with two NOR gates 129 and 130 and one transistor 131 providing pulse shaping and driving capability for the clock inputs of the flip-flops.

Figure 6:
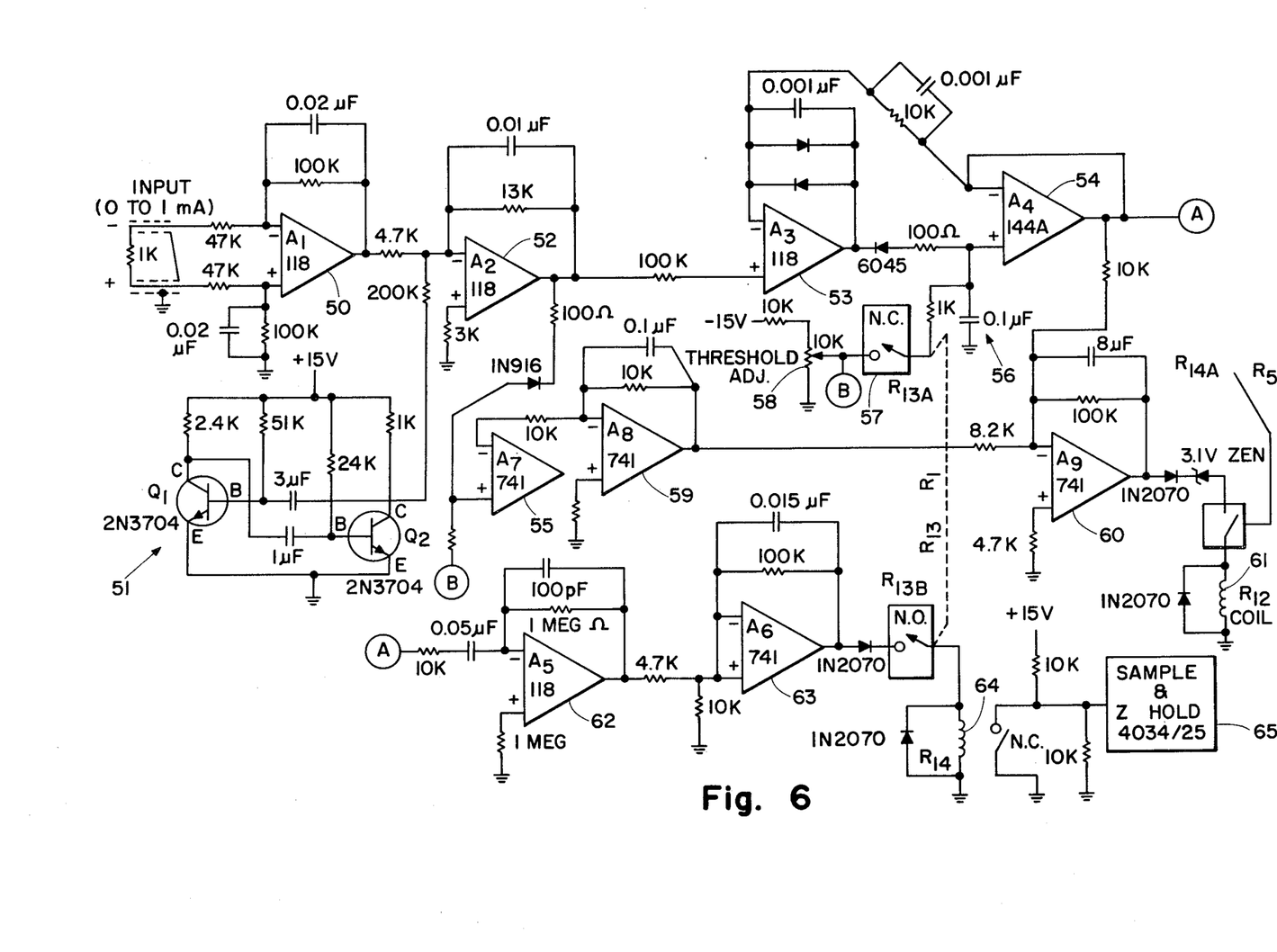
FIGS. 6 to 12 are electrical circuits illustrating one control system for orienting and scanning, a wafer.

RELAYS—FIGS. 6, 7, and 9

All relays are reed type with mercury wetted contacts. Relays 132 and 133 are latching. That is, they remain in contact when the energizing potential is removed and the energizing potential must be reversed to cause the relay to latch in the other position. Two coils are provided on each latching relay to enable polarity reversal easily.

Figures 11, 12:
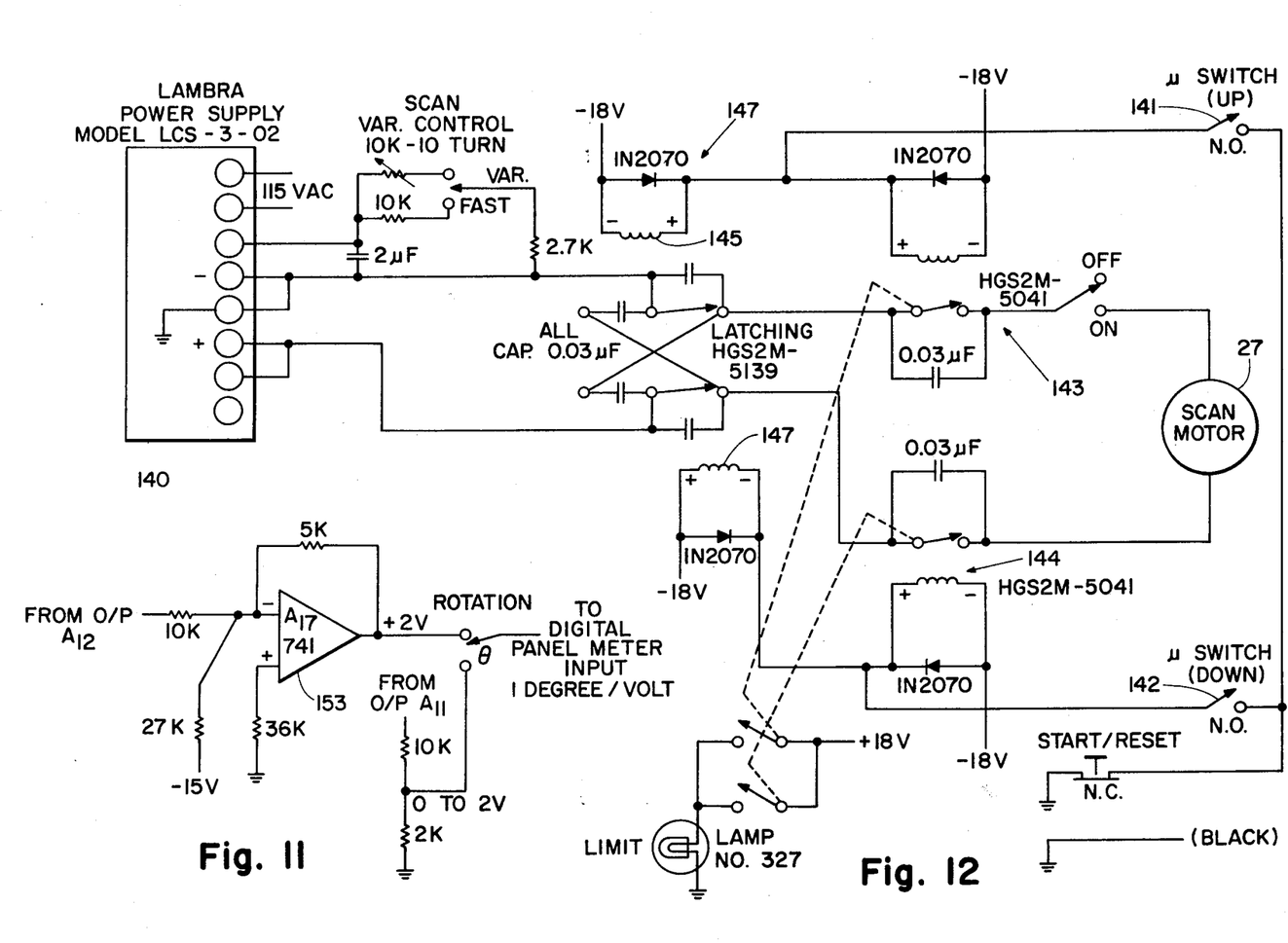

DIGITAL PANEL METER—FIG. 11

A digital panel meter is used to indicate the relative position of rotation or $\theta$ angle. Amplifier 153 converts the 0 to +10 volts from amplifier 71 (FIG. 7) to ±2 volts so that the digital panel meter reads 1 volt/degree. A five to one voltage divider similarly converts the output from amplifier 70 (FIG. 7) to 0 to +2 volts or 1 volt/degree on the $\theta$ axis.

For the remaining relays, a driving circuit as illustrated in FIG. 10 is provided for each relay. Each circuit comprises an inverter 134 followed by a transistor 135 forming a buffer and a driver.

The circuits illustrated in FIGS. 6 to 10 are interconnected at connections indicated by letters or numerals positioned in small circles.

SCAN CIRCUIT—FIG. 12

This circuit is for the control of the scan motor 27 and is operative only after the orientation of the wafer is complete. If a topograph is not required, i.e. the apparatus is being used to determine the correct orientation of the wafer, this circuit is not used.

The power for the scan motor 27 is supplied by a Lambda modular power supply 140 which is resistance programmed at approximately 1000 ohms per volt. The programming resistors are 2.7K ohms in series with 10K ohms, fixed or variable. The "FAST" provides approximately 12 volts output and the "VAR" provides 2 to 12 volts.

The scan assembly has two microswitches one of which 141 activates at the limit of travel in the up direction and the other 142 in the down direction. It is possible to vary the limits by adjusting the position of mechanical activators provided. Closing either the up or down microswitch energizes relay 143 or relay 144 and coil 145 or coil 146 of latching relay 147.

Relay 143 or 144 open circuits the scan motor 27 and the latching relay 147 reverses the polarity of voltage from the scan motor power supply. The "START/RESET" pushbutton switch 148 (normally closed) de-energizes relays 143 or 144 and the scan motor 27 runs until the other microswitch closes.

The sequence of events to orient a silicon wafer, as previously described in relation to FIGS. 2 to 5 can be related to FIGS. 6 to 12, in a brief simple manner, as follows. After positioning the wafer, the start pushbutton 105 (FIG. 8) is operated. This starts the $\theta$ angle motor 30 which rotates the wafer until one of the limit switches (not shown) is actuated, and a peak is detected and memorized during rotation. The rotation of the motor 30 is then reversed until the peak has been passed; finally the motor 30 is again reversed to bring the wafer back to the peak position. This is carried out by the arrangement of the circuit of FIG. 7, the individual steps being switched by the shift register of FIG. 8.

After positioning at the peak for the $\theta$ axis, the wafer is then rotated about the axis normal to the wafer surface—the $\gamma$ rotation—by motor 33. Again this rotation is first in one direction, reversed by operation of a limit switch and finally re-reversed to be finally positioned at the peak. These steps are also carried out by the arrangement of the circuit of FIG. 7, with individual steps switched by the shift register of FIG. 8.

After positioning at the peak for the $\gamma$ rotation, the rotation about the $\theta$ axis is repeated again to optimize the peak reading for the $\theta$ angle. Once again this fixed sequence of steps is carried out by the arrangement of the circuit of FIG. 7, switching being by the shift register of FIG. 8.

Each phase of rotation about an axis, i.e. forward past peak, reverse past peak and forward to peak requires five flip-flops, and these flip-flops 90–94, FIG. 8, switch the first rotational sequence for the $\theta$ axis; flip-flops 95–99 switch the rotational sequence for the $\gamma$ axis and flip-flops 100–104 switch the second rotational sequence for the $\theta$ axis.

After orientation of the wafer the scanning circuit, FIG. 12, is actuated if a topograph is required.

It will be seen that the circuits illustrated in FIGS. 7 to 12 are arrangements of known devices, and do not form a specific part of the present invention except to illustrate a way of controlling rotation of the wafer to give or check orientation. It is not considered necessary to give further, detailed description of the circuits as the details are well known and considerable variation can be made while still providing the desired result.

What is claimed is:

1. Apparatus for the orientation of a crystal wafer comprising; a carrier for holding the wafer inclined slightly from the vertical and having its front surface facing slightly upwardly; a support for the carrier; rotating means for rotation of the carrier about a first axis substantially normal to the wafer front surface and for rotation about a second axis substantially parallel with the wafer front surface; an X-ray generator for producing a beam of X-rays and impinging the beam on the wafer for diffraction thereby; and means for rotating the carrier about the first and second axes and for measuring the intensity of diffraction for each axis of rotation.

2. Apparatus as claimed in claim 1, said carrier including a datum surface for cooperation with a datum surface on the crystal wafer.

3. Apparatus as claimed in claim 1, said means for rotating the carrier controlled in accordance with the intensity of diffraction whereby said crystal can be oriented relative to each axis for a maximum diffraction of said beam of X-rays.

4. Apparatus for the production of X-ray togographs of crystal wafers, comprising: a carrier for holding a wafer in an inclined plane with a front surface inclined slightly upwardly; a support for the carrier; means for rotating the carrier about a first axis substantially normal to the wafer front surface and about a second axis substantially parallel with the wafer front surface; an X-ray generator for producing a beam of X-ray for impinging on the wafer surface for diffraction thereby; control means and measuring means for rotating the carrier and wafer about the two axes and detecting the peak intensity of diffraction for each axis and for controlling the rotation of the carrier to orient the wafer for maximum diffracted beam intensity; and means for scanning the wafer with the X-ray beam and for recording the diffracted radiation.

5. Apparatus as claimed in claim 4, said carrier including a datum surface for cooperation with a datum surface on the crystal wafer.

6. Apparatus as claimed in claim 4, said means for recording the diffracted radiation comprising a film pack.

7. A method of orienting a crystal wafer comprising: resting a wafer on a carrier at a slight inclination to the vertical with a front surface inclined slightly upwards; impinging a beam of X-rays on the surface; rotating the wafer about a first axis substantially normal to the surface—and about a second axis substantially parallel to the surface; measuring the intensity of diffraction of the X-ray beam and controlling the rotation of the wafer about the two axes in accordance with the measured diffraction to orient the wafer.

8. A method as claimed in claim 7 including positioning the wafer on the carrier in a predetermined orientation.

9. A method of producing X-ray topographs of crystal wafers comprising; resting a wafer on a carrier with a front surface slightly inclined to the vertical and facing upwardly; generating a beam of X-rays and impinging the beam on the wafer for diffraction thereby; detecting and measuring the diffraction of the beam while rotating the wafer sequentially about a first axis substantially normal to the front surface and about a second axis substantially parallel with the wafer to detect the maximum intensity of the diffracted beam for each axis; controlling the rotation of the wafer in accordance with the measurement of the maximum intensity of the diffracted beam to orient the wafer for maximum diffracted beam intensity; scanning the wafer with said beam of X-ray and recording the diffracted radiation.

10. A method as claimed in claim 9 including positioning the wafer on the carrier in a predetermined orientation.

11. A method as claimed in claim 9 including recording the diffracted radiation on a film pack.

References Cited

UNITED STATES PATENTS

| | | | |
|---|---|---|---|
| 2,798,957 | 7/1957 | Holden et al. | 250—51.5 |
| 3,609,356 | 9/1971 | Schwuttke | 250—51.5 |

JAMES W. LAWRENCE, Primary Examiner

H. A. DIXON, Assistant Examiner